Aug. 27, 1929.  J. BYSTRICKY  1,725,975
COUPLING DEVICE
Filed June 21, 1926
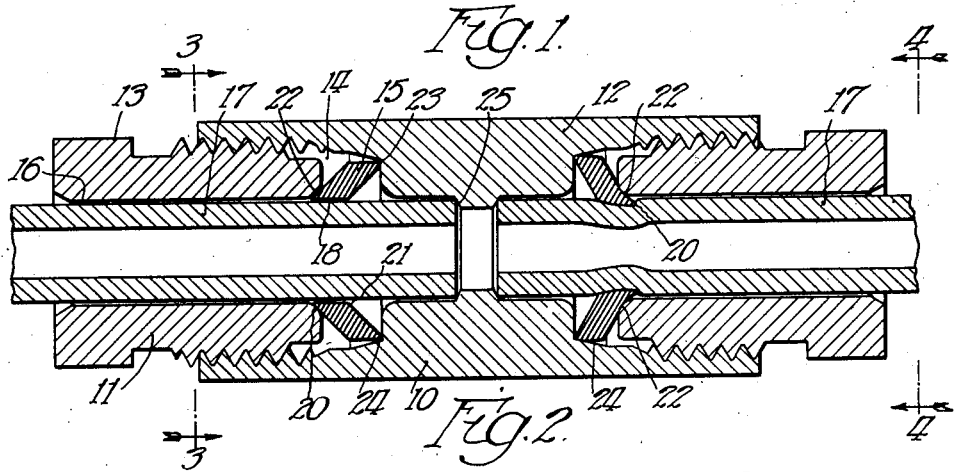
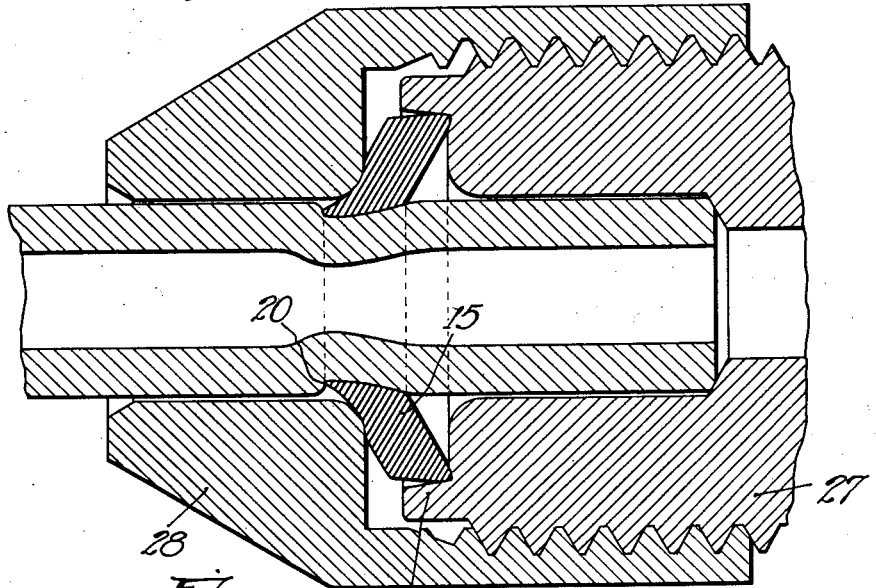
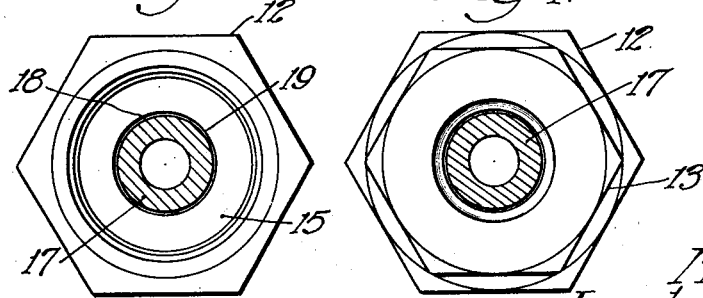
Inventor.
Joseph Bystricky
Emery, Booth, Janney & Varney
Attys.

Patented Aug. 27, 1929.

1,725,975

UNITED STATES PATENT OFFICE.

JOSEPH BYSTRICKY, OF CHICAGO, ILLINOIS.

COUPLING DEVICE.

Application filed June 21, 1926. Serial No. 117,572.

This invention relates to pipe coupling devices and aims to provide an improved device of this character which is reliable in its action and maintains an efficient joint or coupling.

The nature of the invention may be best understood by reference to one illustrative device embodying the invention and shown in the accompanying drawing.

In said drawing:

Fig. 1 is a longitudinal section of a double pipe coupling, one end of which shows the coupling partially assembled and the other end shows a completed coupling.

Fig. 2 is a longitudinal section of a portion of a coupling enlarged to show clearly the pertinent details.

Fig. 3 is a transverse section (taken on the line 3—3 of Fig. 1) showing the interior of the coupling, the screw plug having been removed.

Fig. 4 is an end view of the coupling, viewed from a plane corresponding to 4—4 of Fig. 1.

The illustrative coupling comprises a pair of relatively contractible members, in this instance typified by the threaded sleeve 10 and an exteriorly threaded plug 11 constructed and arranged to be assembled upon a pipe or other member to which the coupling is to be applied. In the present instance the opposite ends of the sleeve 10 are threaded to provide for a double coupling whereby plain ends of two pipes may be similarly coupled together. The central portion of the sleeve is conveniently provided with a squared or hexagonal exterior 12 to aid in the assembly of the coupling. Likewise the exterior 13 of the plug 11 is made in squared or hexagonal form for the same purpose. Obviously any other appropriate construction for receiving assembling tools or wrenches may be utilized.

The sleeve and plug are relatively constructed and arranged to provide a space 14 for the reception of the packing member herein typified by a shell or washer 15 whose surfaces are non-plane with respect to the opening therein. The inner bore 16 of the plug 11 is advantageously made of a size to fit fairly closely over the pipe 17, yet not so closely as to interfere with ready assembly of the coupling members.

The packing member which is herein represented by an integral conical washer may advantageously be made of an appropriately hard metal such as steel, or provided with edges which are harder than the surface of the pipe or member to be coupled. In the present embodiment the hole 18 in the packing member is made just large enough to receive readily the pipe to be coupled. The clearance need be only great enough so that within ordinary manufacturing tolerances all packing devices will readily slip over the pipe or other member for which they are designed. In the present form the wall 18 of the hole 19 is cylindrical and perpendicular to the plane of the hole but may be inclined relatively thereto or tapered so that it is inclined at a slight angle to the periphery of the pipe. Where the face 18 is not parallel with the periphery of the pipe, the inclination or taper is preferably such that the outer edge 20 of the hole is of somewhat less diameter than the inner edge 21 thereof.

In assembling the coupling, the packing member is in this instance compressed in a direction tending to flatten it by relatively contracting or drawing together the adjacent parts 10 and 11. The edge of the plug 11 is preferably constructed and arranged whereby it engages the packing member at 22, a distance from its inner edge, thus serving (against the opposite pressure of the sleeve 10 at the outer edge 23 of the packing member) as a fulcrum about which the inner edge of the packing ring seems to swing. Whether or not the foregoing describes accurately what takes place, the result of such compression or distortion is that the relatively hard edge of the packing member bites into or grips the pipe 17, thereby forming a tight joint therewith.

The character or efficiency of this joint is obviously not dependent on either the character of the surface of the pipe or the original edge on the packing member. Neither need be perfectly accurate or smooth. The edge of the packing member cuts into the pipe and forms a joint surface thereon which perfectly conforms to the joint surface at the edge 20 of the packing,—thereby making a perfect joint, the efficiency of which is in part maintained by a sort of spring action of the packing.

The foregoing joint is supplemented by the tight joint at 22, with the plug, and at 23 with the sleeve 10. At 22, the original surface may be somewhat flattened under pressure, thereby improving the joint; and at 23, the edge of the packing member may be designed so that it will cut to some extent into the sleeve.

In some instances, the distortion of the packing member may cause a supplementary reduction in diameter in the hole 19 which results in a gripping of the pipe throughout the cylindrical surface of the hole and a corresponding contraction of the pipe. Further contraction in the diameter of the hole 19 may be effected by designing the diameter of the interior of the sleeve at 24 so that it snugly fits the outer edge of the packing member, thereby preventing any expansion in outer diameter of the packing member during its compression. Thus all distortion of the packing member during the flattening process is concentrated in a reduction of the diameter of the hole 19 and in the turning action whereby the edge 20 of the hole bites into the pipe. The taper of the surface 24 engaged by the outer edge of the packing member not only insures a tight fit, but facilitates disassembly of the coupling.

In view of the foregoing, the illustrative coupling may be advantageously employed with pipes whose outer surface is not perfect. Moreover, it forms a particularly efficient joint with copper pipes and other pipes whose metal is so soft that it does not adequately resist the pressure of ordinary compression packings. It is difficult with such pipes to develop and maintain enough pressure to provide a permanently tight joint. The illustrative coupling is particularly advantageous in small gasoline and oil lines on automobiles where vibration is severe.

By placing the packing member 15 in the fitting so that its smaller end is engaged by that part of the fitting which ordinarily is rotated relative to the pipe, the tendency to twist the pipe in tightening the coupling (particularly where the pipe is small) is eliminated. In other words, the torsion of the relatively stationary member (10) of the fitting against the outer edge of the packing, at 23, exceeds (because of the larger radius of the torsional force) that of the other member (11) at 22, thereby holding the packing against rotation with the plug 11, and avoiding twisting of the pipe.

Preferably, the sleeve or equivalent member is provided with a seat 25 against which the end of the pipe abuts whereby to increase the rigidity with which the pipe is held.

Fig. 2 illustrates the operation of the packing member with another type of fitting or coupling. In that fitting the outer edge of the packing engages a flange 26 on the nipple portion 27 of the fitting. A cap 28 constructed and arranged to screw on nipple 27, co-operates with the latter and the interposed packing member to secure the results described above.

Obviously where only one pipe is connected with a coupling in the manner above described, the opposite end of the coupling, that shown for example at the right in Fig. 2, may be formed in any desired shape with either an interior or exterior thread or provided with any desired type of fitting or appliance.

The fittings are designed to be sold in partially assembled condition, that is with the packing ring in place and the plug or equivalent member screwed in. To utilize the coupling, it is simply necessary to insert the end of the pipe (without any disassembly of the coupling) and turn down the plug or the like until the packing ring takes hold.

Obviously the invention is not limited to the details of the illustrative device since these may be variously modified. Moreover, it is not indispensable that all features of the invention be used conjointly since certain features may be advantageously employed in various different combinations and subcombinations.

Having described one embodiment of my invention, I claim:

In a coupling for pipes or the like the combination comprising a pair of relatively adjustable coupling elements having bores to receive the member to be coupled, and a hardened continuous packing ring of substantial width interposed between the coupling elements, said ring having a sharp inner edge engageable with the member to be coupled and being of substantial thickness relative to its diameter so as to transmit to its inner edge the compressive force of said coupling elements without substantial distortion of its body, said ring engaging one of said elements closely adjacent to but not at said inner edge and engaging said other element a substantial distance from said inner edge whereby the compressive force of said coupling elements applies a turning moment to said ring about the inner line of engagement with said first mentioned element to cause said sharp edge to cut into the member to be coupled, said ring being sufficiently resilient to maintain the efficiency of the grip on said member and to release its grip on said member upon separation of said coupling elements.

In testimony whereof, I have signed my name to this specification.

JOSEPH BYSTRICKY.